Nov. 7, 1961  L. J. REITMAN  3,007,446
CONDUITS FOR HYDRAULIC DEVICES
Filed Jan. 21, 1959
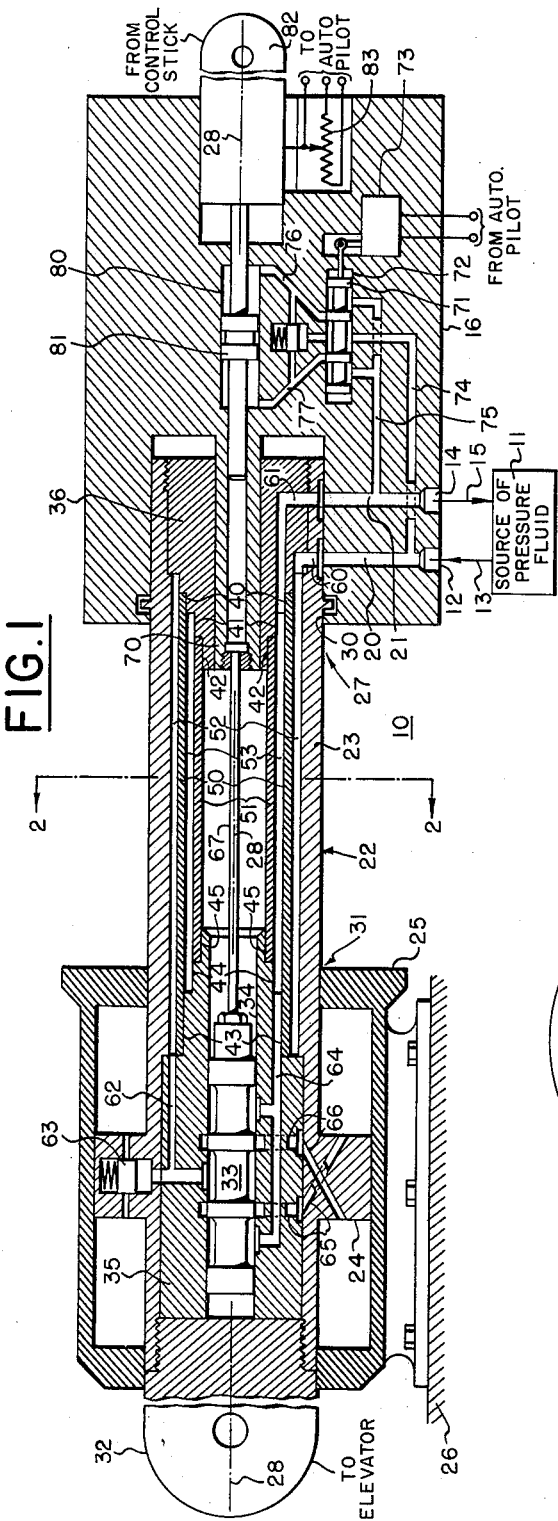
INVENTOR
LESTER J. REITMAN
BY
Henry Huff
ATTORNEY

United States Patent Office 3,007,446
Patented Nov. 7, 1961

3,007,446
CONDUITS FOR HYDRAULIC DEVICES
Lester J. Reitman, Long Beach, N.Y., assignor to Sperry Rand Corporation, a corporation of Delaware
Filed Jan. 21, 1959, Ser. No. 788,227
2 Claims. (Cl. 121—41)

This invention relates to hydraulic actuators and more particularly to means for forming conduits between spaced portions of a hydraulic actuator.

Previously, when it was desired to provide a conduit between spaced portions of a hydraulic actuator, a passage was drilled between the spaced portions. When the spaced portions are relatively close together, this can be readily accomplished. However, when the portions are spaced at a considerable distance from each other and particularly when the metal through which the passage is to be drilled is hardened for high temperature operation or other reasons, drilling the passage between the spaced portions becomes a very difficult and expensive task. To avoid this problem, the prior art also discloses the use of piping connecting the spaced portions which is external to the hydraulic actuator. This expedient results in a bulky and cumbersome hydraulic unit with the external piping subject to leakage caused by vibration and maltreatment, particularly when extremely high pressure fluids are conveyed through the external piping.

The problem becomes aggravated when the hydraulic actuator has two parts, one of which is movable with respect to the other, and it is desired to convey high pressure fluid from one part to the other part or to each of the parts. The only solution prior to the instant invention necessitated connections for pressure and return fluid on each part of the hydraulic actuator as well as flexible hosing between the parts or between the part and the source of pressure fluid. Flexible hoses are undesirable because they are prone to leakage and induce undesired coercive forces which must be overcome to position the respective parts of the hydraulic actuator. Further, the flexible hoses are bulky and add considerable unnecessary weight as well as being susceptible to rupture when subjected to high fluid pressure.

Accordingly, it is a primary object of the present invention to provide one or more conduits within a hydraulic actuator between relatively widely spaced first and second portions thereof which may be formed without drilling through the actuator.

It is a further object of the present invention to provide conduits between first and second spaced portions of a hydraulic actuator that are compact, sturdy, and will withstand extremely high pressure fluid without deterioration.

It is an additional object of the present invention to provide conduits between spaced portions of one part of a hydraulic actuator that is movable with respect to another part of said actuator so that a minimum of pressure and return connections and piping are required.

Another object of the present invention is to provide a hydraulic actuator that is compact, ruggedly constructed and reliable in operation due to unique means for conveying pressure fluid through the actuator.

The present invention overcomes the above problems and achieves the aforementioned objects by providing one or more conduits disposed entirely within the hydraulic actuator that are formed by a plurality of hollow members coaxially disposed one within the other extending between first and second portions of the hydraulic actuator. The adjacent surfaces of the hollow members are spaced in order to form the aforementioned conduits. Preferably, but not necessarily, the hollow members are in the form of axial tubes disposed within the hydraulic actuator and connected between the first and second portions thereof.

Other objects and advantages of the present invention will become apparent upon a study of the following disclosure when considered in connection with the accompanying drawings, wherein:

FIG. 1 is a sectional view of a multiple-input type of hydraulic actuator in which coaxial tubes form supply and return conduits between first and second portions of a part of said actuator;

FIG. 2 is a sectional view taken along lines 2—2 of FIG. 1 showing the coaxial arrangement of the tubes forming the conduits; and FIG. 3 is a sectional view of an embodiment of the present invention showing a plurality of coaxial tubes forming a plurality of supply and return conduits.

While the present invention is applicable in many types of devices, an embodiment of the invention will be explained for purposes of example with respect to a multiple-input type of hydraulic actuator which may be adapted for use in aircraft where the benefits of compactness, reliability, and minimum weight are particularly advantageous. The multiple-input hydraulic actuator of FIG. 1 may be utilized, for example, in lieu of the multiple-input hydraulic actuator disclosed in patent application S.N. 580,957 of Zupanick et al., entitled "Automatic Pilot and Manual Booster Control System for Dirigible Craft," filed April 26, 1956 now Patent No. 2,936,135, issued May 10, 1960.

Referring to FIG. 1, a hydraulic actuator 10 is connected to a source of pressure fluid 11 by means of supply connection 12 and flexible hose 13. Fluid is returned from the actuator 10 to the source of pressure fluid 11 by means of return connection 14 and flexible hose 15. The supply and return connections 12 and 14, respectively, are mounted on the secondary actuator 16 or first part of hydraulic actuator 10. Passages 20 and 21 through the secondary actuator 16 connect supply and return connections 12 and 14, respectively, to a second part, generally indicated as 22, of actuator 10. The second part 22 of actuator 10 includes a hollow cylindrical piston rod 23 and a main piston 24 integral therewith. The cylindrical piston rod 23 has an axis of revolution 28.

Main piston 24 is disposed to slide within a main cylinder 25 that, in turn, is fixed with respect to the airframe 26 by being bolted thereto. The piston rod 23 of part 22 extends exteriorly of both ends of main cylinder 25. One extremity of the piston rod 23 may be connected by lug 32 to the elevator of an airplane, for example, to control the movement thereof as indicated by the legend. The other extremity or first portion 27 of the piston rod 23 is adapted to slide within a bore 30 of secondary actuator 16 thus making the second part 22 movable with respect to the first part or secondary actuator 16 of hydraulic actuator 10. The second part 22 has a second portion 31 thereof in relatively widely spaced relation to the first portion 27. In the embodiment shown in FIG. 1, the second portion 31 of part 22 includes a pressure fluid utilization apparatus in the form of a primary control valve spool 33 slidably disposed in a cylinder 34 of valve sleeve 35, all of which are coaxially mounted with respect to and within the hollow piston rod 23. The lug 32 is screwed into one extremity of the piston rod 23 and secures valve sleeve 35 fixed with respect to the piston rod 23. The rightward portion of valve sleeve 35 has cylindrical stair-step shoulders 43, 44 and 45 of decreasing diameter cut therein for reasons to be explained.

At the other extremity of piston rod 23, i.e., the first portion 27 thereof, a cylindrical support member 36 is securely screwed to the interior of the piston rod 23 and is coaxial therewith. The leftward portion of support member 36 has cylindrical stair-step shoulders 40, 41 and 42 of decreasing diameter cut therein which correspond to those of valve sleeve 35. Thus, shoulders 40, 41 and 42 of support member 36 have diameters equal to those of corresponding shoulders 43, 44 and 45 of valve sleeve 35, respectively, to support tubes 50 and 51 which are connected between support member 36 and valve sleeve 35. One extremity of tube 50 is supported on shoulder 40 of support member 36 while its other extremity is supported on the corresponding shoulder 43 of valve sleeve 35. One extremity of tube 51 is supported on shoulder 42 of support member 36 while its other extremity is supported on the corresponding shoulder 45 of valve sleeve 35.

Referring now to FIGS. 1 and 2, tubes 50 and 51 are so disposed that each has its axis of revolution coincident with the axis of revolution 28 of piston rod 23. Tubes 50 and 51 are coaxially disposed one within the other and within hollow cylindrical piston rod 23. Each of the hollow members 23, 50, and 51 is in spaced relation radially with respect to the adjacent member thereby providing conduits between the adjacent surfaces of members 23, 50 and 51. Thus, a supply conduit 52 is provided between the adjacent surfaces of piston rod 23 and tube 50 between the first and second portions 27 and 31, respectively, of part 22, while a similar return conduit 53 is formed by the adjacent surfaces of tubes 50 and 51. To form a conduit, for example, conduit 53, the innermost member 51 of a pair of members 50, 51 has an outside diameter that is less than the inside diameter of the other member 50 of said pair 50, 51 so that the adjacent surfaces of said pair 50, 51 are spaced with respect to each other along their entire length.

Preferably, the radial dimensions of each of the tubes are such that a close fit is obtained between the inside of the tube and the shoulders upon which it is supported, for example, the inside diameter of tube 51 is approximately equal to the diameter of shoulders 42 and 45. Further, the outside diameter of tube 51 is preferably equal to the diameter of shoulders 41 and 44 in order to provide a flush, continuous conduit surface.

In certain applications of the present invention, it may be desirable to use O-ring seals mounted in the shoulders to form fluid seals between the inside of the tube and the shoulders upon which the tube is supported. In addition to providing a fluid seal, the use of O-ring seals allows the tolerances between the mating parts to be relaxed since the flexible O-ring will compensate for minor discrepancies.

As shown in FIG. 1, passage 60 connects one extremity of supply conduit 52 to passage 20 while passage 61 connects one extremity of return conduit 53 to passage 21. Passage 62 connects the other extremity of supply conduit 52 to the cylinder 34 within valve sleeve 35. Passage 62 also connects to the piston of emergency by-pass valve 63. Passage 64 connects the cylinder 34 to the other extremity of return conduit 53. When uncovered by the lands of valve spool 33, passages 65 and 66 connect the cylinder 34 to the right and left-hand portions, respectively, of the main cylinder 25.

One extremity of the valve spool 33 is connected by rod 67 to a cylindrical projection 70 of secondary actuator 16. Support member 36 is centrally bored to receive the cylindrical projection 70 of the secondary actuator 16 and slides thereon.

Within the secondary actuator 16, a secondary control valve spool 71 is disposed to slide within cylinder 72. Valve spool 71 is connected to be stroked by torque motor 73 in accordance with electrical signals which may be received from an automatic pilot as indicated by the legend. Passage 74 connects passage 20 to cylinder 72 while passage 75 connects cylinder 72 to passage 21. When uncovered by the lands of valve spool 71, passages 76 and 77 connect the cylinder 72 to the right and left-hand portions of the secondary control cylinder 80. Secondary piston 81 is disposed to slide within the secondary control cylinder 80. One extremity of secondary piston 81 is connected to a manual input lug 82 which, in turn, may be connected to receive manual inputs from the control stick as indicated by the legend. Potentiometer 83 is fixed with respect to secondary actuator 16 while the slider arm thereof is connected to lug 82 so that the relative displacement of the lug 82 with respect to the secondary actuator 16 may be measured and provide a feedback signal to the automatic pilot as indicated by the legend.

The multiple-input hydraulic actuator of FIG. 1 may be operated in manual, manual-boost or automatic modes of operation similar to that described with respect to the multiple-input hydraulic actuator of the aforementioned patent application S.N. 580,957, now Patent No. 2,936,135. For purposes of describing the operation of the instant invention, the hydraulic actuator of FIG. 1 will be described with respect to an automatic mode only. An electrical signal is received from the automatic pilot by torque motor 73 and strokes valve spool 71 to the right, for example. This action ports pressure fluid from source 11 through hose 13, connection 12, passages 20 and 74, through cylinder 72, into passage 76 and the right-hand portion of cylinder 80. Due to the internal friction in the mechanical linkage between lug 82 and the control stick (not shown), piston 81 remains stationary and the pressure fluid in the right-hand portion of cylinder 80 moves secondary actuator 16 to the right, as viewed in the drawing. Fluid is exhausted from the left-hand portion of cylinder 80, through passage 77, cylinder 72, passages 75 and 21, return connection 14 and hose 15 back to source 11, where the fluid is recirculated.

Movement of secondary actuator 16 to the right also moves primary control valve spool 33, which is connected thereto, to the right. This allows pressure fluid to be ported from source 11 through hose 13, connection 12, passages 20 and 60, conduit 52, passage 62, through cylinder 34, passage 66 and into the left-hand portion of cylinder 25. With cylinder 25 fixed with respect to the airframe, the second part 22 is moved to the right, as viewed in the drawing. At the same time, fluid is exhausted from the right-hand portion of cylinder 25 into passage 65, through cylinder 34, into passage 64, conduit 53, passages 61 and 62, connection 14, hose 15 and thence to source 11, where it is recirculated. The movement of part 22 to the right also positions the elevator (not shown) accordingly, since it is connected to lug 32 of part 22. An electrical signal of the opposite phase will move the secondary valve spool 71 to the left, which, by a similar sequence of events, will drive the elevator in the opposite direction.

In the automatic mode, manual inputs from the control stick may be superimposed upon the electrical inputs from the automatic pilot in order to control the elevator in accordance with the algebraic summation of the two inputs. One method of providing the above is to connect the output of potentiometer 83 in feedback fashion to a summing amplifier (not shown) which is also connected to receive the output of the automatic pilot. The output of the summing amplifier is connected to control the torque motor 73. Then, when the control stick is moved, lug 82 will also be moved and will position the slider arm of potentiometer 83 accordingly. The output signal of the potentiometer 83 is algebraically summed with the signal from the automatic pilot in the summing amplifier. The output from the summing amplifier controls the torque motor 73 to stroke the valve spool 71 in accordance with the composite signal. By a sequence of operations similar to that described above, the elevator is positioned in accordance with the electrical signal from the automatic pilot and the mechanical signal from the control stick.

From the foregoing, it will be appreciated that the present invention provides conduits of any desired length that are inexpensive, compact, rugged and not subject to deterioration or leakage. To provide conduits of the length required in the hydraulic actuator 10 of FIG. 1 by drilling through the hardened steel piston rod 23, would be an extremely expensive and difficult task. The prior art alternative would be to provide additional supply and return connections on part 22 which would be connected by additional supply and return flexible hosing to the source of pressure fluid 11 or to the secondary actuator 16. By eliminating the need for the additional supply and return connections and hosing, the present invention minimizes the weight of the actuator, eliminates the coercive forces caused by the additional flexible hosing and minimizes the possibility of leakage and rupture of the flexible hosing.

Although the invention has been described with respect to right circular cylindrical tubes, it is within the scope of the present invention to form the conduits by tubes having other shapes, such as square, hexagonal or any other suitable configuration.

Referring now to FIG. 3, an embodiment of the present invention is shown which provides a plurality of supply and return conduits. This is accomplished by mounting a plurality of tubes coaxially one within the other, depending upon the number of supply and return conduits desired. Thus, for example, tubes 90, 91, 92 and 93 are mounted on corresponding cylindrical shoulders of spaced elements such as valve spool 35 and support member 36 in a manner similar to that shown in FIG. 1. This arrangement forms two supply conduits 94 and 95 and two return conduits 96 and 97. Any number and any combination of supply and return conduits can be provided by suitably increasing the number of coaxial tubes and suitably connecting the supply and return passages.

To simplify the drawings, O-rings and other leakage prevention devices have not been shown. However, it is understood that they could be used in a conventional manner to prevent leakage where necessary.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A hydraulic actuator comprising first and second movable parts and a stationary main cylinder, said second part including a main piston slidably disposed within said main cylinder, said second part further including a hollow cylindrical piston rod integral with said main piston and extending exteriorly from both ends of said main cylinder, one end of said piston rod being adapted to be connected to a member to be controlled, the other end of said piston rod being disposed to slide within said first part, supply and return connections for pressure fluid mounted on said first part, means including hydraulic means disposed within said first part and connected to said supply and return connections for controlling the movement of said first part in accordance with the algebraic summation of a plurality of signals, fluid flow control means within said hollow piston rod and connected to said first part for controlling the flow of pressure fluid to said main cylinder in accordance with the movement of said first part whereby the member to be controlled is controlled in accordance with the algebraic summation of said signals, and conduit means for conveying pressure fluid between said fluid flow control means and said supply and return connections, said last-mentioned means including hollow tubes coaxially disposed one within the other and within said hollow piston rod, the adjacent surfaces of said piston rod and said tubes being spaced to provide conduits therebetween, said piston rod and said tubes providing conduits for at least a portion of the distance between said fluid flow control means and said supply and return connections.

2. In a hydraulic actuator as claimed in claim 1 wherein said conduit means includes first and second tubes coaxially nested one within the other and within said hollow piston rod, the adjacent surfaces of said piston rod and said tubes being spaced to provide conduits therebetween, said piston rod and said first tube providing a conduit for at least a portion of the distance between said supply connection and said fluid flow control means, and said first tube and said second tube providing a conduit for at least a portion of the distance between said fluid flow control means and said return connection.

References Cited in the file of this patent

UNITED STATES PATENTS

| | | |
|---|---|---|
| 2,633,102 | Baldwin et al. | Mar. 31, 1953 |
| 2,693,243 | Strandell et al. | Nov. 2, 1954 |
| 2,705,940 | Edwards | Apr. 12, 1955 |
| 2,810,370 | Fox et al. | Oct. 22, 1957 |

FOREIGN PATENTS

| | | |
|---|---|---|
| 749,564 | Great Britain | May 30, 1956 |